United States Patent [19]
Claywell

[11] 3,771,848
[45] Nov. 13, 1973

[54] TOOL CHEST

[76] Inventor: James R. Claywell, 1406 N. Orange St., Plant City, Fla. 33566

[22] Filed: Mar. 1, 1972

[21] Appl. No.: 230,582

[52] U.S. Cl.................. 312/250, 144/285, 312/237, 312/277
[51] Int. Cl............................................ A47b 91/00
[58] Field of Search..................... 312/250, 249, 209, 312/281, 277, 235, 237; 144/285

[56] References Cited
UNITED STATES PATENTS

| | | | |
|---|---|---|---|
| 2,505,658 | 4/1950 | Wilson | 144/285 |
| 3,520,583 | 7/1970 | Case | 312/250 X |
| 3,118,685 | 1/1964 | Jordan | 144/285 X |
| 1,167,046 | 1/1916 | Campbell | 312/240 X |
| 2,480,876 | 9/1949 | Paden | 312/240 X |
| 2,981,549 | 4/1961 | Hotton | 312/250 X |
| 3,395,959 | 8/1968 | White | 312/250 X |

Primary Examiner—James T. McCall
Attorney—Stein & Orman

[57] ABSTRACT

A portable tool chest comprising a cabinet having various tool storage facilities mounted thereon for the purpose of storing and transporting tools to a job site wherein the chest further comprises a work bench capable of slidingly engaging the opening to the interior of the cabinet or to the work storage means or alternately to be removed from the cabinet in closing position and attached in substantially perpendicular orientation thereto such that a carpenter or the like has access to the tools storage facility and also have the work bench substantially horizontally oriented so as to perform work thereon. Wheels and slide means attached adjacent thereto are mounted on the cabinet so as to transport the chest to any desired location including up and down stairs or the like.

8 Claims, 11 Drawing Figures

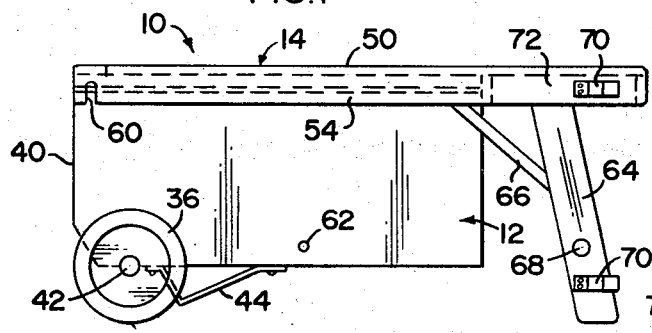
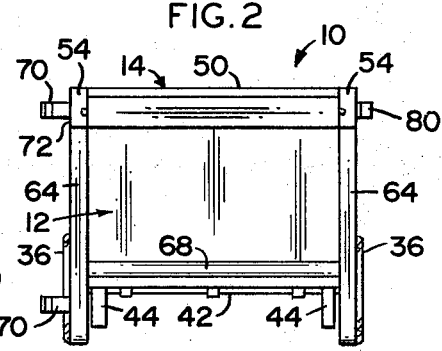
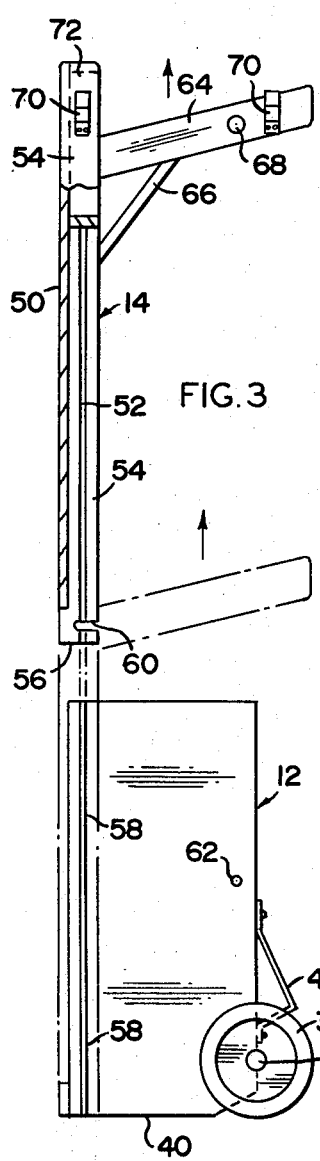
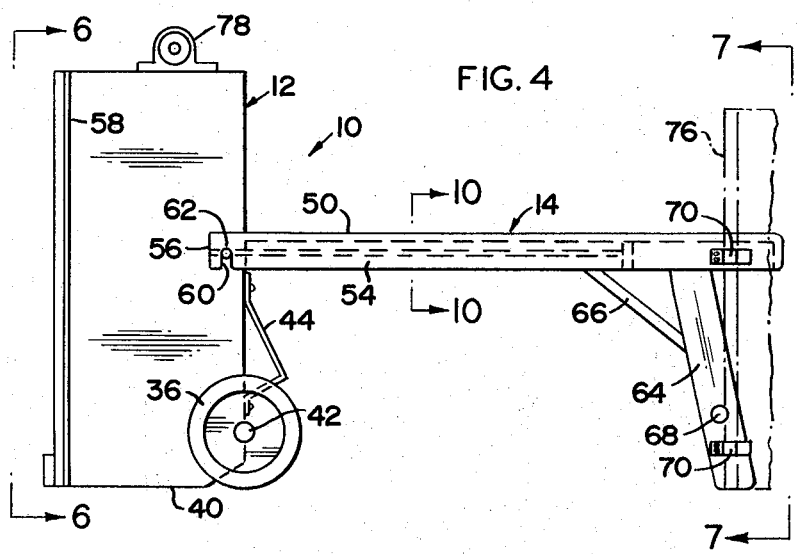
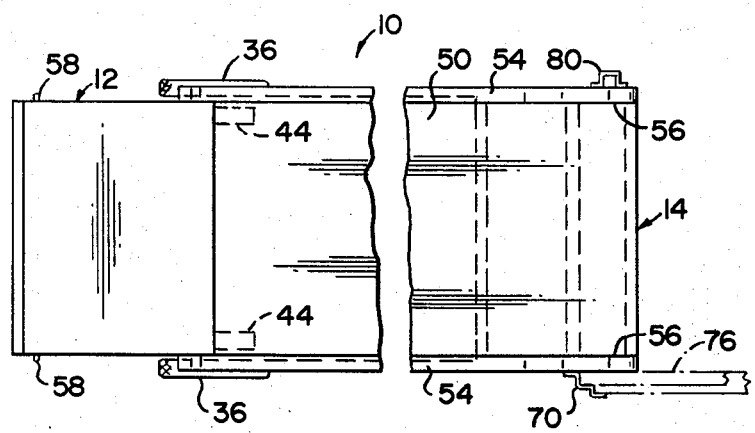

PATENTED NOV 13 1973 3,771,848

TOOL CHEST

BACKGROUND OF THE INVENTION

1. Field of the Invention

This invention relates to a portable tool chest of the type having a tool storage facility mounted within a storage cabinet and a work bench connectable to said cabinet so as to act as a closure when the chest is being transported or in operative work performing relation to the cabinet allowing access thereto.

2. Description of the Prior Art

Numerous structures exist in the prior art which are primarily directed for the storage of tools and the like. It is of course obvious that a large number of specialized tools are an absolute necessity for a skilled workman such as a carpenter, plumber, etc. to perform his job adequately. As modern day society has progressed, more and more tools have been devised to make the skilled workmans job easier or allow him to produce a better, higher quality product. Accordingly, the number of tools actually required at a job site in order for such a workman to adequately perform his job have increased greatly. The problem has obviously arisen of transporting these tools to the actual location where the work is being performed from the workman's truck or other means of transportation wherein the vast majority of his tools are carried. This is particularly troublesome when the carpenter or the like is finishing the interior of a large multi-story building. It is obviously much more time consuming and accordingly expensive if such a skilled workman has to continually returning to his truck or main tool storage area to obtain the required tools.

In order to overcome these problems various prior art devices have been designed wherein the carpenter or other skilled workman can manually carry his tools from the main storage area to the job site. However, because of the large number of tools required, the design of an adequate carriage facility such as a tool chest is difficult. The smaller chest which the workman can carry by hand does not hold the large number of tools required. On the other hand if the chest is made large enough to carry more tools the chest becomes too heavy for the ordinary workman to carry.

Recognizing that the workman can be expected to carry only relatively small chests because of the weight problem, a number of prior art devices have been developed which include much larger storage facilities mounted on wheels wherein the workman can manually pull or push the chest to the desired location. Problems have arisen in the use of these type of devices in that they are extremely cumbersome, often times still too heavy to get to hard to reach locations, such as upstairs, and generally inapplicable for the ultimate purpose for which they are designed.

In addition to the transporting of large numbers of tools to a desired job site, it is also desirable to have a work area at the same job site and also adjoining the location of the tools on that job site. While some of the portable tool chest presently available have tried to combine a tool chest with a work area in the form of a work bench or the like, the majority of those presently on the market are overly complex, and generally too expensive or difficult to transport in order to be useful to the skilled workman performing the job directly on the job site.

Therefore, it can be recognized that there is a great need in this particular area for an efficient, relatively simple structured tool chest capable of being portable so as to transport large number of tools to a desired location while at the same time providing enough work space so that the workman can perform the desired job at the location and in the general area of the tools transported thereto.

SUMMARY OF THE INVENTION

This invention relates to a portable tool chest capable of being manually transported from a main tool storage area, for instance, to the job site whereat various jobs in which the tools are going to be utilized are performed.

More specifically the tool chest of the subject invention comprises a cabinet having a plurality of tool storage facilities mounted therein. These facilities may take the form of drawers slidably positioned within the cabinet and arranged in a stacked type array relative to one another. Various tools of course can be placed within the drawers. In addition a door which is hingedly mounted over an open face of the cabinet and in partially closing relationship to the drawers is positioned to be closed over the face of the drawers, when the cabinet is to be transported. Of course when it is desired to reach the tools within the drawers, the door is swung open. In addition various tools can be hung directly on the interior surface of the door due to the fact that the door is arranged in spaced relation to the front of the drawers. This space has a configuration sufficient enough to allow the tools to be hung on this interior surface. Cabinet support means in the form of wheels may be mounted adjacent to the lower or main supporting surface of the cabinet. In this position the wheels are not in ground engaging position or in position to support the weight of the cabinet when the cabinet is oriented substantially vertically wherein the load is resting entirely on this lower supporting surface. Slide means in the form of angled iron bars are mounted on the same surface of the cabinet as are the wheels. These slide means are connected to the cabinet immediately adjacent to and slightly above the wheels and are primarily provided to allow the cabinet to be easily transported over stairs or the like. It is important to note that the location of these slide means are in cooperative relation to the wheels such that the weight of the cabinet when transported over stairs or like surfaces may be readily transferred from the slide means to the wheels as the stair or bump is overcome.

A work bench means in the form of a table or bench-like planar surface is connectable to the cabinet in a plurality of locations. More specifically, each longitudinal edge of the planar surface of the work bench has a depending flange formed therein. The interior surface of the flange is formed with a longitudinally extending channel. This channel is positioned and designed to slidingly engage an outwardly extending rib formed on the corresponding positioned edges or sides adjacent the opening of the cabinet. When the cabinet is desired to be closed the work bench is merely slid over the opening by cooperative engagement between the slideway or groove on the workbench and the track-like ridges on the cabinet. In this position the cabinet and work bench is ready for transportation to a desired job site. Alternately, the cabinet and attached work bench can be oriented such that the longitudinal axis of the chest can be disposed in a substantially horizontal relationship to the ground or other surface on which it is positioned. In this position the work area of the work bench is free to be used as such but the tool storage area is closed for ready access. When set up for operation the cabinet and attached work bench is arranged such that the longitudinal axis of the cabinet is arranged in a vertical orientation. The work bench is slid off of the opening to the cabinet and attached by hook means mounted in cooperative relation to one another on both the free end of the work bench and the mid point adjacent the rear surface of the cabinet. These hook means more specifically comprises slots arranged in the ends of the dependent flanges. The knotches hook onto outwardly extending rods or fingers formed on the side of the cabinet.

Work bench supporting means are mounted on the opposite end of the work bench in the form of outwardly extending legs. The length of these legs are specifically dimensioned so as to align the planar surface of the work bench in a substantially horizontal relationship to a supporting surface or ground by virtue of the fact that the length of the legs are substantially the same distance from the ground as is the hook means which supports the other end of the work bench. A hand rail used for manually propelling the chest is interconnected between the two legs which, as previously discussed, form the work bench supporting means. Various other accessories may be attached at convenient points along the cabinet and work bench. These accessories may include a door hanging bracket assembly mounted on the edge and side surface of the work bench and leg respectively. In addition, various tool receptacles may be mounted on the opposite surface of the work bench or at any other point convenient for use. In addition, tools themselves such as grinders or the like may be fastened securely to the outer surface of the cabinet or other points of convenient location on the chest.

The invention accordingly comprises the features of construction, combination of elements and arrangment of parts which will be exemplified in the construction hereinafter set forth in the scope of the invention will be indicated in the claims.

BRIEF DESCRIPTION OF THE DRAWINGS

For a fuller understanding of the nature and objects of the invention reference should be had to the following detailed description taken in connection with the accompanying drawings in which:

FIG. 1 is a side view of the portable tool chest of the subject invention in assembled form.

FIG. 2 is an end view of the subject tool chest as shown in FIG. 1.

FIG. 3 is a cross sectional, partially exploded view of the relationship of the work bench to the cabinet structure.

FIG. 4 is a side view of the cabinet and work bench in operative position.

FIG. 5 is a top plan view of the assembled cabinet and work bench as shown in FIG. 4.

Similar reference characters refer to similar parts throughout the several views of the drawings.

DETAILED DESCRIPTION

Figure 6:
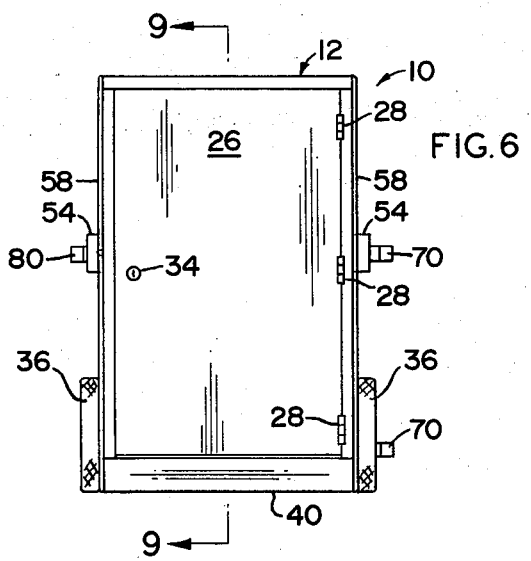
FIG. 6 is an end view taken along lines 6—6 of FIG. 4.
Figure 7:
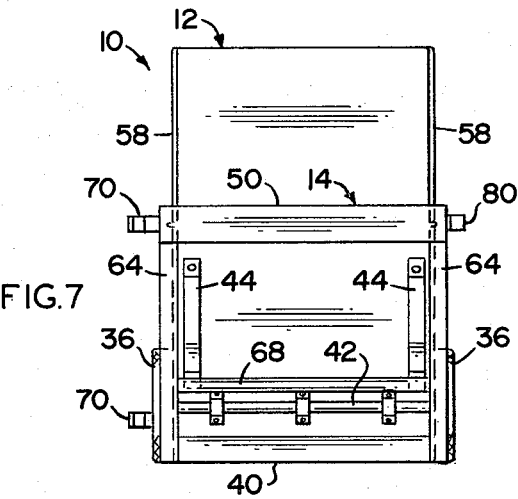
FIG. 7 is an opposite end view taken along line 7—7 of FIG. 4.
Figure 8:
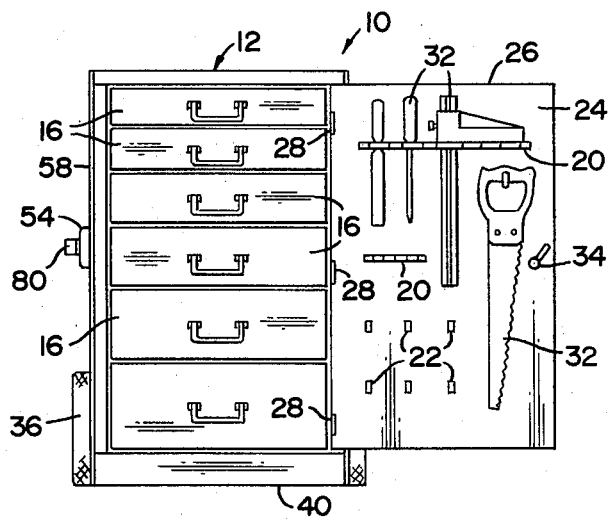
FIG. 8 is an end view substantially shown in FIG. 6 wherein the closure means attached to the cabinet is in opened position.
Figure 9:
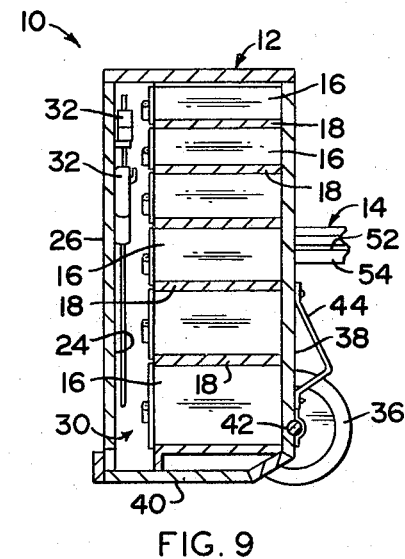
FIG. 9 is a side sectional view showing the interior of the cabinet structure taken along lines 9—9 of FIG. 6.
Figure 10:
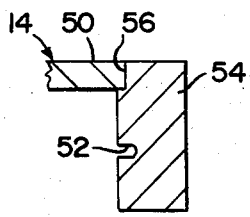
FIG. 10 is a sectional view taken along lines 10—10 of FIG. 4.

The subject invention relates to a portable tool chest indicated generally in FIGS. 1 and 2 as 10. This tool chest comprises a cabinet 12 having a work bench means 14 which may be attached to the cabinet 12 in a number of operative positions which will be explained in detail hereinafter. As shown best in FIGS. 6, 8 and 9 the cabinet comprises tool storage facilities connected thereto. These tool storage facilities may take the form of a plurality of drawers 16 mounted in sliding relation to the interior of the cabinet on various shelves or drawer supporting racks 18. It should be obvious that other type of tool storage facilities such as shelves per se could be substituted for the drawers as shown in FIGS. 8 and 9. The tool storage facilities further comprise two hanging racks 20 and hooks 22 forming various tool receptacle affixed to the interior surface 24 of closure means which is in the form of door 26. This door is hingedly attached at 28 to the open side of cabinet 12 and serves to lock the drawers or other storage facilities therein. As shown in FIG. 9, a space 30 is provided between the rear surface of the door and the front surface of the drawers 16. This surface is dimensioned sufficient enough to allow the hanging of various tools 32 on the tool receptacle 20 and 22 as shown. The door 26 may also include any conventional lock and fastening means 34.

Cabinet supporting means may comprise wheel means 36 which as shown are attached to rear surface 38 adjacent to load bearing surface 40. The wheel 36 may include an axle assembly 42 which itself is rotatably connected to surface 38 by any applicable manner. The cabinet support means further include slide means 44 connected to surface 38 of cabinet 12. The slide means may be in the form of angle irons specifically configured and positioned relative to wheels 36 so as to allow the cabinet and tool chest, when assembled for transportation, to be readily moved up and down stairs or the like.

As stated above the tool chest of the subject invention also comprises a work bench means 14 which comprises a outer planar surface 50 which is intended to provide work area on which various jobs are performed. As best shown in FIGS. 1, 2 and 3 the work bench 14 may be positioned in enclosing relation to the interior of cabinet 12 and to the storage facilities mounted therein. This sliding connection between work bench 14 and cabinet 12 is provided by connector means which in this embodiment may comprise slideways 52 formed in flanges 54 which are dependingly attached to the edges 56 of the planar surface 50. These slideways 52 are specifically configured to slidingly engage outwardly extending ridges 58 located on the corresponding edges adjacent to the opening of the cabinet. As is clearly shown both the slideways 52 and the edges 58 are correspondingly configured to one another so as to establish a sliding, substantially sealing relation to one another thereby prohibiting entrance of rain or the like into the interior of the cabinet.

Referring to FIGS. 4 and 5, the connector means may further include hook means in the form of slots 60 formed in one end of each flange 54. These slots are designed to hook over in supported relation to a finger or rod 62 formed midway down and on both lateral surfaces of cabinet 12.

Work bench support means include legs 64 attached approximate to the opposite end of the hook means wherein legs 64 are supportingly attached to the under surface of work bench 14 by braces 66. The length of legs 64 is such as to orient and support work bench 14 in a substantially horizontal relation to the ground with the help of surface 40. This orientation or operative position of the tool chest is clearly shown in FIG. 4. A hand rail 68 is arranged in interconnecting relation to the free end of leg 64 and serves as a means to manually propel the chest when transporting the tools from a main storage area to a job site.

Figure 11:
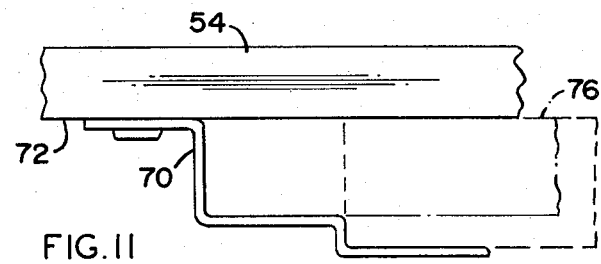
FIG. 11 is a partial top view showing the door hanging brackets attached to the work bench.

Various accessories may be attached to the tool chest at convenient points. Such accessories include a door hanging bracket means 70 wherein separate brackets are connected in aligned relation to one another to the surface 72 of flange 54 and to the outer surface of one of the legs 64 shown in FIG. 1. As shown in FIG. 11 the bracket 70 is designed to secure a door or the like 76 in upright position so that it may be worked on. Other accessories may also be attached to the tool chest at various points such as grinding means 78 and tool receptacles 80.

It will thus be seen that the objects made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, all statements of the scope of the invention, which as a matter of language, might be said to fall therebetween.

Now that the invention has been described,

What is claimed is:

1. A portable tool chest comprising: cabinet means including tool storage means mounted therein, cabinet support means connected to said cabinet in spaced relation to one end thereof, whereby said support means is positionable into and out of operative supporting relation thereto dependent upon the orientation of said chest, work bench means mounted on said cabinet, connector means attached to both said cabinet and said work bench means, said connector means including slide means formed on both said work bench and said cabinet means such that said work bench means slidingly engages said cabinet in removably sealing relation to the interior of said cabinet and said storage means, said connector means disposed on both said cabinet and said work bench such that said work bench means is connectible to said cabinet in substantially perpendicular relation to the longitudinal axis of said cabinet, whereby said chest functions as both a storage means and a work surface.

2. A tool chest as in claim 1 wherein said cabinet support means comprises wheel means rotatably mounted on said cabinet and disposed such that the periphery thereof is in spaced relation to one end of said cabinet whereby said wheel is positionable into and out of cabinet supporting relation dependent upon the orientation of said cabinet.

3. A tool chest as in claim 1 wherein said tool storage means comprises drawer means movably mounted in said cabinet, closure means movably connected to said cabinet in operative relation to the cabinet interior.

4. A tool chest as in claim 3 wherein said closure means includes a door hingedly mounted so as to at least partially enclose said drawer means, said door positioned in spaced relation to said drawer means, said space dimensioned so as to permit tools to be mounted therein.

5. A tool chest as in claim 2 further comprising slide means mounted on said cabinet adjacent to said wheel means, said slide means extending outwardly from said cabinet in cooperative cabinet supporting relation thereto dependent upon the orientation of said cabinet.

6. A tool chest as in claim 1 wherein said slide means comprises at least two slide tracks extending substantially parallel to the longitudinal axis of said work bench means, each of said two positioned along one edge portion of said bench means, and slideway means correspondingly configured to said slide tracks and positioned adjacent to said tool storage means whereby said work bench means at least partially encloses the cabinet interior.

7. A tool chest as in claim 1 wherein said connector means comprises hook means formed in cooperative relation on said cabinet and said work bench means respectively such that when engaged said work bench is arranged in substantially perpendicular relation to the longitudinal axis of said cabinet.

8. A tool chest as in claim 1 further including bench support means including support legs dimensioned to extend outwardly from said work bench means into alignment with said cabinet support means such that said cabinet may be supported on said cabinet support means and said work bench support means dependent upon the orientation of said cabinet.

* * * * *